United States Patent
Yumura et al.

(10) Patent No.: US 10,864,837 B2
(45) Date of Patent: Dec. 15, 2020

(54) IN-CABIN CUP HOLDER

(71) Applicant: TOYOTA JIDOSHA KABUSHIKI KAISHA, Toyota (JP)

(72) Inventors: Jun Yumura, Toyota (JP); Manabu Akita, Toyota (JP); Kosuke Endo, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 16/279,201

(22) Filed: Feb. 19, 2019

(65) Prior Publication Data
US 2019/0263310 A1    Aug. 29, 2019

(30) Foreign Application Priority Data

Feb. 27, 2018  (JP) .................................. 2018-033248

(51) Int. Cl.
*B60N 3/10*        (2006.01)
*B60Q 3/225*       (2017.01)

(52) U.S. Cl.
CPC ............. *B60N 3/105* (2013.01); *B60N 3/101* (2013.01); *B60Q 3/225* (2017.02)

(58) Field of Classification Search
CPC ........ B60N 3/105; B60N 3/101; B60Q 3/225; B60Q 3/20; B60R 7/04
USPC ......................................................... 296/37.8
See application file for complete search history.

(56) References Cited

U.S. PATENT DOCUMENTS

| 9,381,843 | B2 * | 7/2016 | Muiter | ................... B60N 3/108 |
| 2015/0183377 | A1 * | 7/2015 | Ruffner | ................... B60N 3/101 |
| | | | | 296/37.8 |

FOREIGN PATENT DOCUMENTS

JP     2009-126389 A    6/2009

* cited by examiner

*Primary Examiner* — Pinel E Romain
(74) *Attorney, Agent, or Firm* — Oliff PLC

(57) ABSTRACT

An in-cabin cup holder which holds a cup includes an upper holder having a cup opening into which the cup is inserted, and a lower holder placed below the upper holder. The lower holder has a recess with a bottom that is positioned below the cup opening and that supports the inserted cup from below, and a side wall that is provided at a periphery of the recess with the bottom, and that surrounds a space above the recess with the bottom. A discharge port for discharging liquid is formed on the side wall.

5 Claims, 4 Drawing Sheets

IN-CABIN CUP HOLDER

CROSS REFERENCE TO RELATED APPLICATION

This application claims priority to Japanese Patent Application No. 2018-033248 filed on Feb. 27, 2018, which is incorporated herein by reference in its entirety including the specification, claims, drawings, and abstract.

TECHNICAL FIELD

The present disclosure relates to an in-cabin cup holder which holds a cup of a drink or the like.

BACKGROUND

In many cases, a cup holder which holds a cup of a drink or the like is provided near a console of a vehicle. For example, in JP 2009-126389 A, a cup holder is formed by forming a recess on a shift lever case of the console.

In some cases, a cup holder is independently formed, and is assembled onto the console or the like. In this case, if there is employed a structure in which the cup holder is divided into a plurality of components which are to be assembled together, the size of each component becomes small, resulting in ease of manufacture. In particular, because the cup holder has many hollow portions, an advantage of dividing into a plurality of components is significant.

When the cup holder is divided into two components, an upper holder and a lower holder, a case may be considered in which liquid falls downward from a gap between the two components. In this case, the liquid may flow on the periphery of the lower holder, and may drop onto a component below, which may result in an adverse effect on the component below. In particular, this becomes problematic when an electronic component such as an ECU is present below the cup holder.

SUMMARY

According to one aspect of the present disclosure, there is provided an in-cabin cup holder which holds a cup, comprising: an upper holder having a cup opening into which the cup is inserted; and a lower holder placed below the upper holder and having a recess with a bottom that is positioned below the cup opening and that supports the inserted cup from below, and a side wall that is placed at a periphery of the recess with the bottom, and that surrounds a space above the recess with the bottom, wherein a discharge port for discharging liquid is provided on the side wall.

According to another aspect of the present disclosure, a pair of guides that protrude toward an outer side and that restrict flow of liquid to a side may be provided on left and right sides of the discharge port.

According to another aspect of the present disclosure, the upper holder may have two cup openings, the lower holder may have two recesses with the bottoms, and the side wall may be placed to surround both of the recesses with the bottoms, including a holder bottom surface between the two recesses with the bottoms.

According to another aspect of the present disclosure, at least one of the discharge ports may be provided on the side wall at a side of the holder bottom surface.

According to another aspect of the present disclosure, at least one of the discharge ports may be provided on the side wall at a side of one of the recesses with the bottoms.

According to the present disclosure, because the discharge port is provided on the side wall of the lower holder, a liquid flow-out portion can be limited to a particular position, and splashing of the liquid onto the component below can be prevented.

BRIEF DESCRIPTION OF DRAWINGS

Embodiment(s) of the present disclosure will be described by reference to the following figures, wherein.

DESCRIPTION OF EMBODIMENTS

An embodiment of the present disclosure will now be described with reference to the drawings. The present disclosure is not limited to the embodiment described herein.

<Overall Structure>

Figure 1:
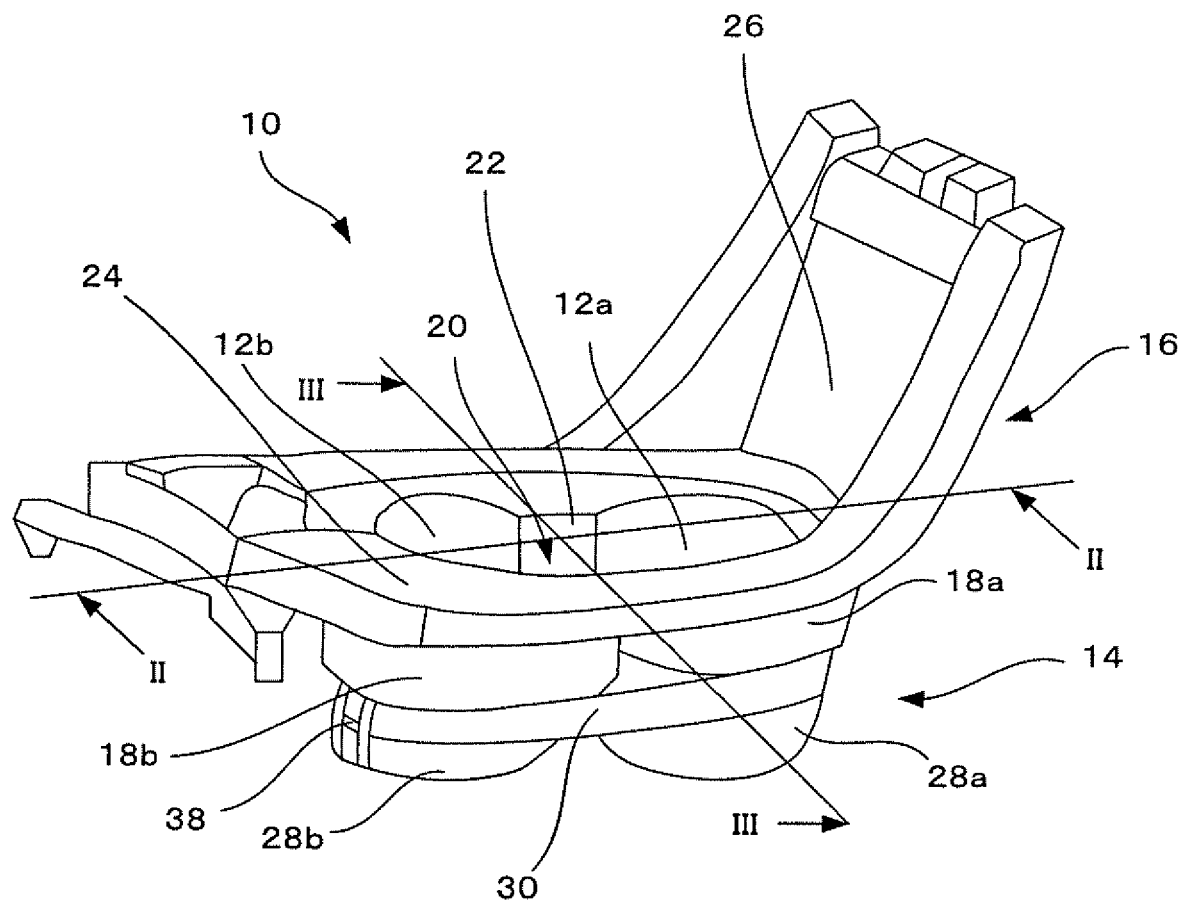
FIG. 1 is a schematic perspective diagram showing an overall structure of a cup holder according to an embodiment of the present disclosure.

FIG. 1 is a schematic perspective diagram showing an overall structure of an in-cabin cup holder according to an embodiment of the present disclosure. A cup holder 10 can hold two cups. In addition, the cup holder 10 is formed by combining, in an up-and-down direction, an upper holder 14 which is an upper member and a lower holder 16 which is a lower member.

The upper holder 14 has ring-shaped portions 18a and 18b which form circumferential surfaces of two cup openings 12a and 12b. Each of the ring-shaped portions 18a and 18b can support an outer side of a cup which is inserted. The ring-shaped portions 18a and 18b extend in the up-and-down direction in correspondence to the shape of the cup, and have diameters which becomes smaller in a tapered shape toward a lower side. In addition, the ring-shaped portions 18a and 18b are opened at the upper and lower sides thereof, and portions where the two ring-shaped portions 18a and 18b are positioned near each other are cut out. The cutout portions are connected by a pair of quadrangular connection side walls 20, to form a connection space 22 which connects the two cup openings 12a and 12b. Therefore, when viewed from above, circular shapes defined by the two cup openings 12a and 12b are connected by the quadrangular connection space 22.

Further, an upper surface portion 24 which extends from the ring-shaped portions 18a and 18b and an upper end of the connection side wall 20 towards the sides forms an upper surface of the upper holder 14. A part of the cup opening 12a of the upper surface portion 24 extends in a slanted upward direction, to form a back surface portion 26. In this exemplified configuration, the back surface portion 26 is formed at a side of the cup opening 12a (on a side opposite from the cup opening 12b), and a cup can be guided by the back surface portion 26 into the cup opening 12a.

Figure 2:
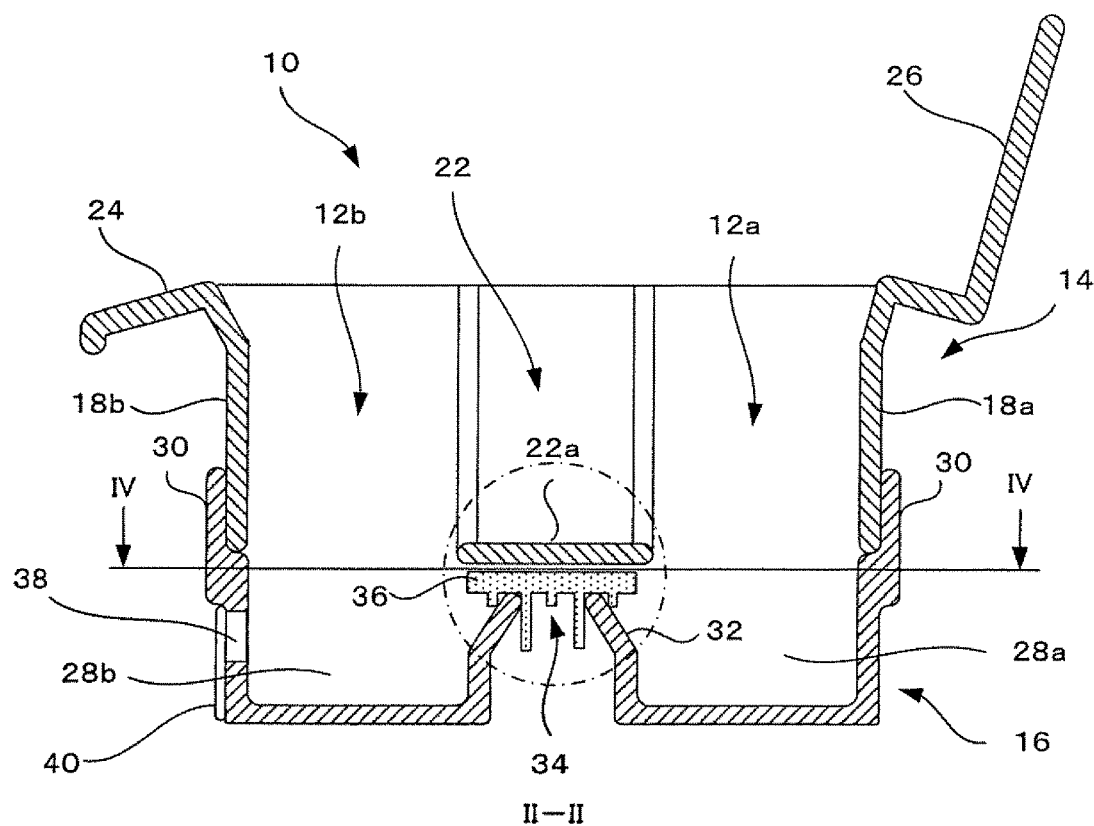
FIG. 2 is a diagram along a cross section II-II (vertical cross section in a longitudinal direction) in FIG. 1.

The lower holder 16 is positioned below the upper holder 14, and the upper holder 14 is fixed onto an upper end of the lower holder 16. The fixation may be realized by various means such as engagement of the upper and lower holders 14 and 16. FIG. 2 shows an example configuration where the upper holder 14 is fixed to the lower holder 16 by fitting.

The lower holder 16 has two recesses with bottoms 28a and 28b, positioned below the ring-shaped portions 18a and 18b. The side wall 20 which extends upward is provided surrounding a holder bottom surface 32 extending at the periphery of the two recesses with the bottoms 28a and 28h.

In this manner, the cup holder 10 has the cup openings 12a and 12b on the upper holder 14 and the recesses with the bottoms 28a and 28b on the lower holder 16, and a cup which is inserted can be held by these structures.

Figure 3:
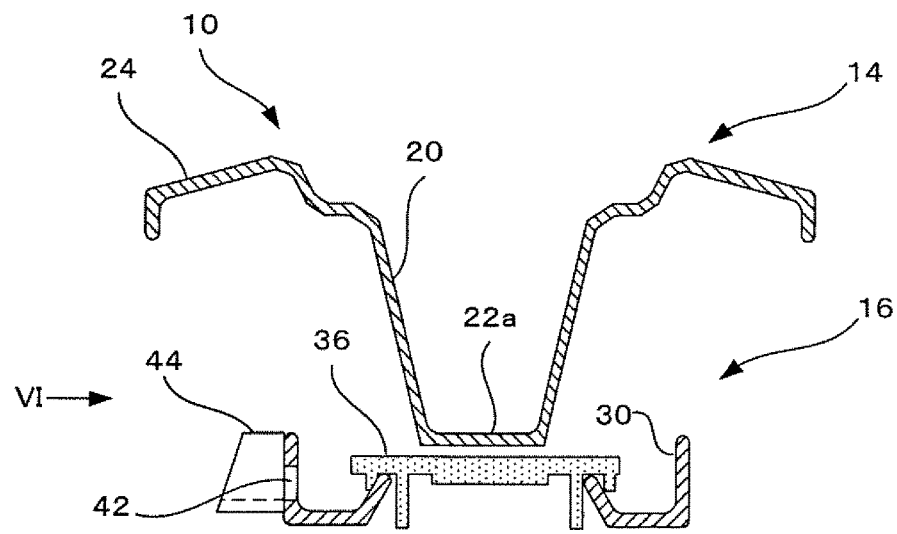
FIG. 3 is a diagram along a cross section (vertical cross section in a short-side direction) in FIG. 1.
Figure 4:
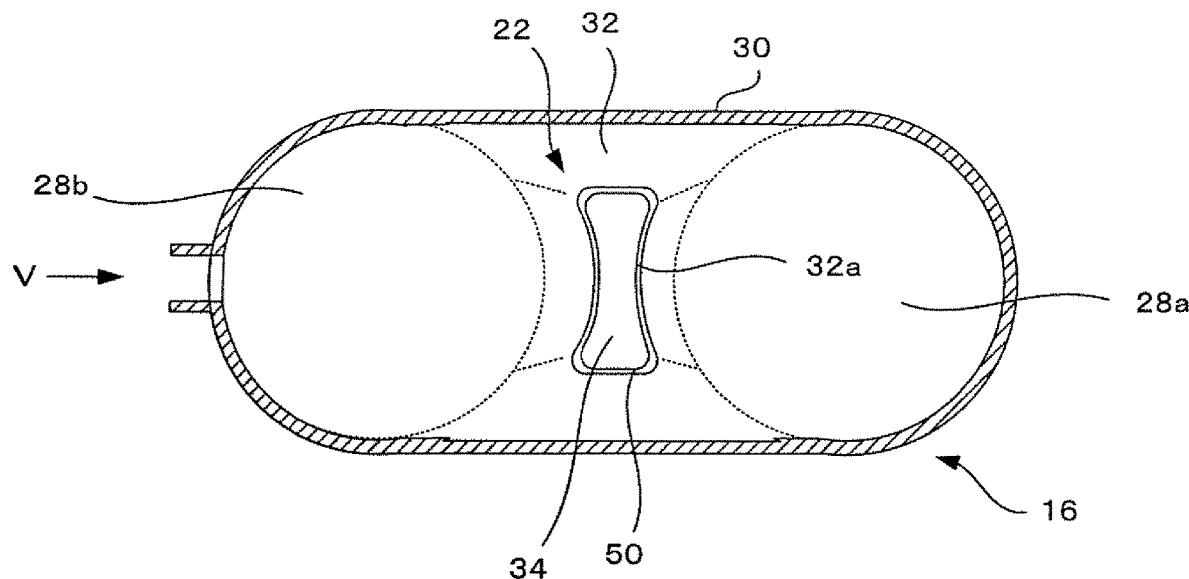
FIG. 4 is a diagram along a cross section IV-IV (lateral cross section) in FIG. 2.

FIG. 2 shows a cross section II-II (vertical cross section in the longitudinal direction) in FIG. 1, FIG. 3 shows a cross section III-III (vertical cross section in the short-side direction) in FIG. 1, and FIG. 4 shows a cross section IV-IV (lateral cross section) in FIG. 2. In these drawings, structures inside the cup openings 12a and 12b, and structures at the side of the cup opening 12b, or the like are omitted. Further, shapes of the ring-shaped portions 18a and 18b and the recesses with the bottoms 28a and 28b are simplified and shown as a circular tube.

As shown in FIG. 2, the recesses with the bottoms 28a and 28b of the lower holder 16 are positioned below the ring-shaped portions 18a and 18b of the upper holder 14. On an inner side of the side wall 30 extending upward from edges of the recesses with the bottoms 28a and 28b, the ring-shaped portions 18a and 18b of the upper holder 14 are positioned.

On the side wall 30 positioned above a portion, of the recess with the bottom 28b, at an opposite side from the recess with the bottom 28a, a discharge port 38 is provided. The discharge port 38 is a quadrangular opening having a predetermined size, and guides 40 are provided on left and right sides thereof. The guide 40 is a rib-shaped protrusion extending in the up-and-down direction. By being positioned on both sides of the discharge port, the guides 40 restrict spread of the liquid discharged from the discharge port 38 to the sides, and guide the liquid downward.

Between the two recesses with the bottoms 28a and 28b arranged side by side, the holder bottom surface 32 is positioned. The holder bottom surface 32 has a shape which spreads to the sides from the edges of the recesses with the bottoms 28a and 28b. At a center of the holder bottom surface 32 connecting the two recesses with the bottoms 28a and 28b, an opening 34 is formed, and a lens 36 for emitting light from below is placed to cover the opening 34 from above.

As shown in FIG. 3, lower ends of the pair of the connection side walls 20 of the upper holder 14 are connected by a bottom portion 22a which extends in the horizontal direction above the lens 36. That is, the bottom portion 22a forms a bottom portion of the connection space 22. At a part of the side wall 30, a quadrangular discharge port 42 is provided. Therefore, the liquid is discharged also from this portion. A gutter-shaped guide 44 is provided on the side wall 30 at a periphery (respective sides and lower side) at an outer side of the discharge port 42. Therefore, the liquid from the discharge port 42 falls from a position slightly distanced from the side wall 30.

As shown in FIG. 4, the connection space 22 is a region sandwiched by the recesses with the bottoms 28a and 28b, which have a circular shape when viewed from above, and has a narrowest width at a center and the width is widened toward the respective ends. In the ends on both sides of the holder bottom surface 32 and at a semicircular portion (edge of the lower holder 16) at an outer side in the longitudinal direction of the recesses with the bottoms 28a and 28b, the side wall 30 which extends upward is positioned.

The side wall 30 connects the edges of the two recesses with the bottoms 28a and 28b viewed from above in a direction of tangent, and a lower end of the side wall 30 is positioned at an end of the holder bottom surface 32. That is, the side wall 30 collectively surrounds the upper spaces of both of the two recesses with the bottoms 28a and 28b. In a region between the two recesses with the bottoms 28a and 28b, and surrounded by the side wall 30, the holder bottom surface 32 has a higher height at a central side thereof. Therefore, the edge of the opening 34 positioned at the center is formed by an upper end 32a of the holder bottom surface 32. In FIG. 4, the lens 36 is omitted.

<Structure of Discharge Port>

Figure 5:
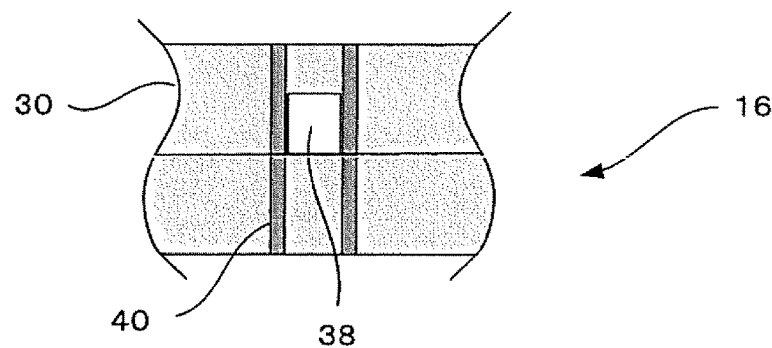
FIG. 5 is a diagram showing a lower holder viewed from a direction V of FIG. 4.

FIG. 5 shows the lower holder 16 viewed from a direction V of FIG. 4. As shown, the discharge port 38 is provided on the side wall 30 above the side surface, of the recess with the bottom 28b, exposed to the outside at an opposite side of the recess with the bottom 28a. The discharge port 38 is a quadrangular opening, and the guide 40 is provided on left and right sides of an outer surface of the side wall 30. The guide 40 is a protrusion extending in the up-and-down direction, and by the guide 40 being positioned on both sides of the discharge port, the liquid discharged from the discharge port is not spread and is guided downward.

Figure 6:
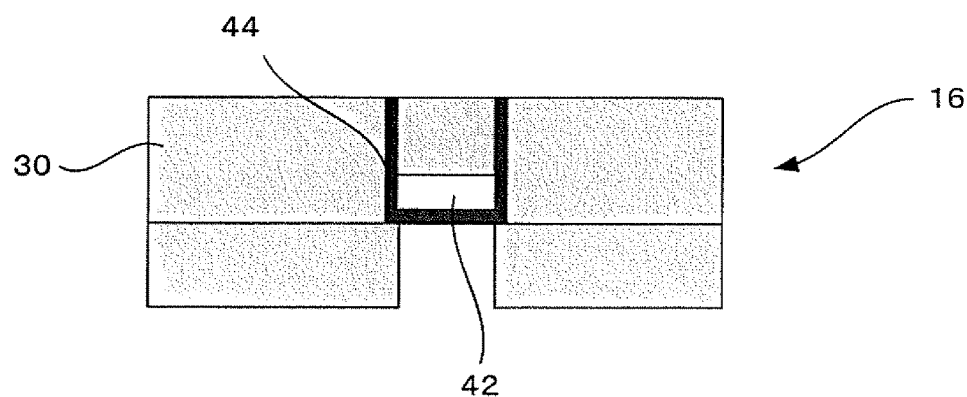
FIG. 6 is a diagram showing a lower holder viewed from a direction VI of FIG. 3.

FIG. 6 shows the lower holder 16 viewed from a direction VI of FIG. 3. As shown, the quadrangular discharge port 42 is provided on the side wall 30 at the side of the holder bottom surface 32. At a periphery of the side wall 30 around the discharge port 42 (respective sides and lower side), the gutter-shaped guide 44 is provided. Therefore, the liquid from the discharge port 42 falls from a position slightly distanced from the side wall 30.

In this manner, in the cup holder 10 of the present embodiment, the discharge ports 38 and 42 are formed at predetermined locations of the lower holder 16, and the guides 40 and 44 are formed therein. Therefore, when liquid is splashed onto the cup holder 10 or the liquid exits the cup, the discharge location of the liquid can be limited. Thus, even when an electronic component or the like is placed below the cup holder, splashing of the liquid can be prevented.

<Structure of Lens>

As shown in FIGS. 2 and 3, over the opening 34 of the holder bottom surface 32, the lens 36 is placed as a lid which is slightly larger than the opening 34. Below the lens 36, a light source such as an LED is placed, and light from the light source is emitted upward through the lens 36. Above the lens 36, the bottom portion 22a of the connection space 22 of the upper holder 14 is positioned, and the light from the lens 36 is reflected by the bottom portion, and is emitted to the side.

Figure 7:
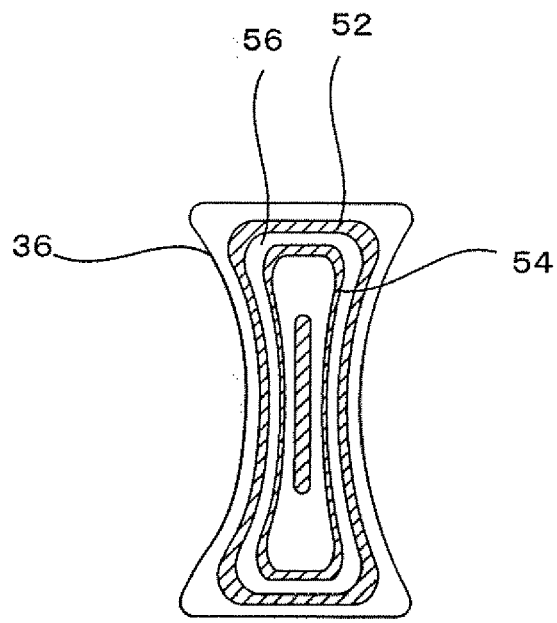
FIG. 7 is a bottom surface diagram of a lens.
Figure 8:
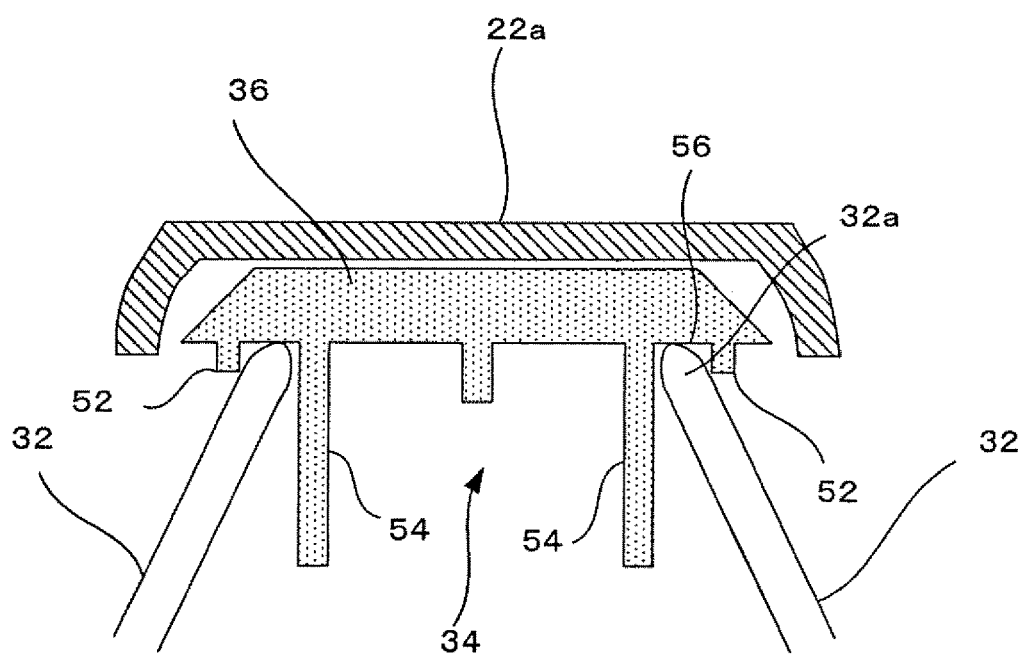
FIG. 8 is an enlarged view of a placement portion of a lens shown by a circle of a dot-and-chain line in FIG. 2.

FIG. 7 is a bottom surface diagram of the lens 36, and FIG. 8 is an enlarged view of a placement portion of the lens shown by a circle of a dot-and-chain line of FIG. 2.

As shown, the lens 36 has a planar shape in which the center is narrow and a width is widened toward the sides in the short-side direction. On the peripheral portion of a lower surface of the lens 36, a rib-shaped protrusion 52 is provided, and a rib-shaped protrusion 54 is provided inside of the rib-shaped protrusion 52 with a predetermined gap therebetween. Both of the two protrusions 52 and 54 are placed to surround the entire circumference of the lens 36 at the lower side of the lens 36, and the gap therebetween is a channel 56. On the other hand, the upper end 32*a* of the holder bottom surface 32 forming the edge of the opening 34 protrudes upward, and is fitted to the channel 56.

In this manner, in the present embodiment, the recess 52 is provided on the lower surface of the lens 36. Therefore, when liquid splashes from the periphery of the lens 36 toward the lens 36, intrusion of the liquid into the inside can be prevented by the protrusion 52. Specifically, momentum of the liquid in the lateral direction is eliminated by the protrusion 52, and the liquid drops downward. With this configuration, it is possible to prevent intrusion of the liquid from a region between the lens 36 and the holder bottom surface 32 and fall of the liquid below the lens 36.

Further, the upper end 32*a* of the holder bottom surface 32 is sandwiched by the two protrusions 52 and 54, and thus, the opening 34 can be reliably covered with the lens 36 as the lid. In addition, by having the uneven structure on the bottom surface of the lens 36, when the lens 36 is fixed to the periphery of the opening by adhesion or the like, the airtightness can be improved, and dropping of liquid or the like to the lower side in this region can be reliably prevented.

<Others>

In the cup holder 10 according to the embodiment described above, two cup openings 12*a* and 12*b*, and two recesses with the bottoms 28*a* and 28*b* are provided so that two cups can be held. Alternatively, only one cup opening and one recess with the bottom may be provided so that only one cup may be held. In this case, only the discharge port 38 may be provided, or the opening 34 and the lens 36 may be provided on the holder bottom surface 32 around the recess with the bottom, and the discharge port 42 may be provided on the side wall 30 thereof. Alternatively, a configuration may be employed in which only one of the discharge ports 38 and 42 is provided.

The invention claimed is:

1. An in-cabin cup holder which holds a cup, comprising:
   an upper holder having a cup opening into which the cup is inserted; and
   a lower holder placed below the upper holder and having a recess with a bottom that is positioned below the cup opening and that supports the inserted cup from below, and a side wall that is placed at a periphery of the recess with the bottom, and that surrounds a space above the recess with the bottom, wherein
   a discharge port for discharging liquid is provided on the side wall.

2. The in-cabin cup holder according to claim 1, wherein a pair of guides that protrude toward an outer side and that restrict flow of liquid to a side is provided on left and right sides of the discharge port.

3. The in-cabin cup holder according to claim 1, wherein the upper holder has two cup openings,
   the lower holder has two recesses with the bottoms, and
   the side wall is placed to surround both of the recesses with the bottoms, including a holder bottom surface between the two recesses with the bottoms.

4. The in-cabin cup holder according to claim 3, wherein at least one of the discharge ports is provided on the side wall at a side of the holder bottom surface.

5. The in-cabin cup holder according to claim 3, wherein at least one of the discharge ports is provided on the side wall at a side of one of the recesses with the bottoms.

\* \* \* \* \*